April 19, 1938.  J. L. STRATTON  2,114,889
RAIL INSPECTION APPARATUS
Filed Sept. 14, 1935
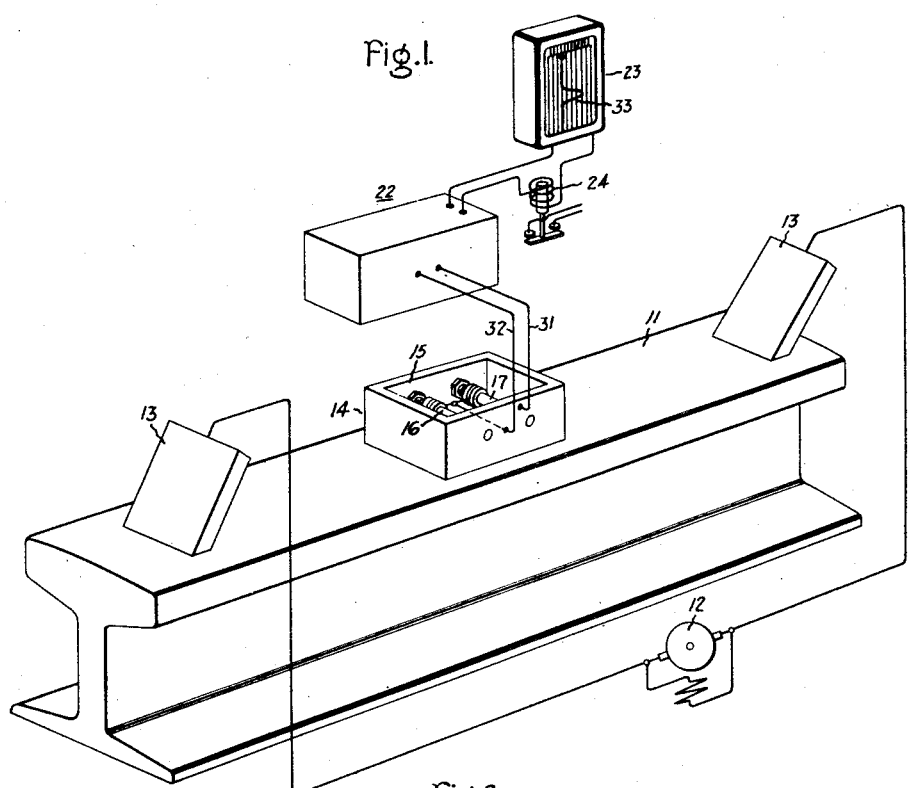
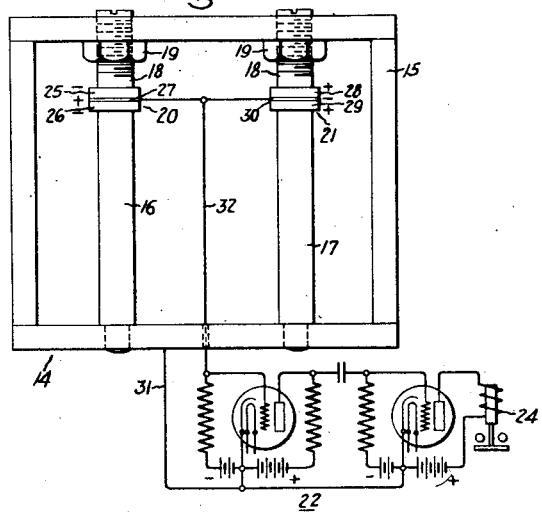
Inventor:
Jerry L. Stratton,
by Harry E. Dunham
His Attorney.

Patented Apr. 19, 1938

2,114,889

UNITED STATES PATENT OFFICE 2,114,889

RAIL INSPECTION APPARATUS

Jerry L. Stratton, Schenectady, N. Y., assignor to General Electric Company, a corporation of New York Application September 14, 1935, Serial No. 40,621

4 Claims. (Cl. 175—183)

My invention relates to magnetic testing devices and methods and concerns particularly arrangements for locating defects in rails.

It is an object of my invention to provide improved, simply constructed, easily operated, rugged apparatus for detecting flaws or defects in materials to be tested.

Other objects of the invention are to obtain freedom from temperature effects, to reduce to a minimum voltage losses, and to avoid lost motion in the apparatus.

Other and further objects and advantages will become apparent as the description proceeds.

My invention utilizes the magnetostrictive properties of magnetic material, that is; the properties of change in stress-strain characteristic with variations in magnetization. The variations in stress-strain characteristic or modulus of elasticity, for example, produce variations in the dimensions of a magnetostrictive material or variations in the natural frequency of vibration of such material when the strength of the magnetic field is altered.

In accordance with my invention in its preferred form, I provide a suitable frame or mounting for carrying a pair of bars of magnetostrictive material along a rail or other device to be tested, and I provide a device for passing current through the rail longitudinally or for otherwise producing a circular magnetic field including a portion, at least, of the rail to be tested and having an axis substantially parallel to the specimen tested. The magnetic field surrounding the test piece tends to magnetize the magnetostrictive bars and any defects, such as flaws or fissures in the rail, tend to distort the magnetic field and to produce unequal magnetization in the magnetostrictive bars. Means are provided for detecting variations in the stress-strain characteristic of the magnetostrictive bars.

The features of my invention which I believe to be novel and patentable will be pointed out in the claims appended hereto. The invention will be more readily understood from the following detailed description when considered in connection with the accompanying drawing in which Fig. 1 is a schematic diagram in perspective representing one embodiment of my invention; and Fig. 2 is a view, partially in plan and partially diagrammatical, representing the magnetic detector unit illustrated in Fig. 1.

In the drawing, like reference numerals are utilized to designate like parts throughout. The invention is illustrated in a form suitable for detecting fissures in railway rails, such as the rail 11. Means are provided, such as a generator 12 connected to a pair of brushes 13 sliding along the rail 11, for passing a current longitudinally through the portion of the rail being tested. A differential magnetic detector or test unit 14 is also provided, which is adapted to be carried along the rail 11 as the brushes 13 slide along the rail. It will be understood that the apparatus is preferably carried by a suitable test car, not shown, which is run along the tracks to be tested. Railway rails are ordinarily of magnetic material, but obviously my invention is not limited to the testing of magnetic material. Furthermore, in the case of magnetic material, my invention is not limited to sending current through the material to set up the external magnetic field.

The differential magnetic detector 14 comprises elements carried by a suitable frame 15 which is preferably of relatively rigid material and is shown in the form of a hollow square. A pair of bars 16 and 17 of magnetostrictive material is so mounted in the frame 15 that the bars are in a position transverse to the general direction of the flow of current through the rail 11. Although I believe all magnetic materials exhibit the property of magnetostriction to a certain extent, the effect is more marked in some materials than in others. Relatively high changes in modulus of elasticity with magnetization may be obtained, for example, from an alloy of approximately sixty per cent cobalt and forty per cent iron or from substantially pure nickel, the change being positive in one case and negative in the other.

Means are provided for subjecting the magnetostrictive bars 16 and 17 to static or dynamic stress and means are also provided which are responsive to the variations in the stress-strain characteristic of the magnetostrictive bars 16 and 17.

Dynamic stress-strain characteristic determining apparatus may take the form of means for setting the bars 16 and 17 in vibration and means for comparing the frequencies of vibration of the two bars. The static form of the apparatus may, however, simply take the form of screws 18 and nuts 19 for substantially fixing the normal length of the bars 16 and 17 with respect to the frame 15 and a pair of piezo-electric units 20 and 21 for detecting variations in the relationship between elongation and force exerted in the bars 16 and 17. The piezo-electric units 20 and 21 are clamped between the end of the bar 16 and the screw 18 and between the end of the bar 17 and the screw 18, respectively. Voltage-responsive means, such as an amplifier 22 and a recorder 23 or a relay 24 are connected to the piezo-electric units 20 and 21 to respond to variations in voltage produced by variations in force acting thereon. Preferably, the electrical connections are such that the piezo-electric units 20 and 21 act differentially and no response is produced in the amplifier 22 when both bars, 16 and 17, are subjected to the same magnetic field.

The piezo-electric units 20 and 21 may take the form of single slabs cut from crystals of quartz or other suitable material, in which case the faces of one polarity will be grounded to the frame 15, the faces of the other polarity will preferably be insulated, and a voltage-responsive connection will be made between the latter faces. However, in order to reduce the loss of voltage through leakage and stray capacity and in order to overcome lost motion which may take place in insulating strips, I prefer to construct each piezo-electric unit 20 and 21 of a pair of piezo-electric elements or slabs cemented to a conducting plate, such as a copper plate, thus using the piezo-electric slabs, themselves, as insulators. The piezo-electric unit 20 comprises a pair of piezo-electric slabs 25 and 26 cemented to a copper plate 27 and the piezo-electric unit 21 comprises a pair of piezo-electric slabs 28 and 29 cemented to a copper plate 30. The arrangement is such that the faces of the piezo-electric slabs which become positive with increasing pressure are cemented to the copper plate in one piezo-electric unit, for example, the unit 20, and the faces which become negative are cemented to the copper plate in the other piezo-electric unit. The amplifier 22 is provided with an input lead 31 connected to the frame 15 and an input lead 32 connected to both the copper plates 27 and 30.

It will be understood that the screws 18 and the nuts 19 are so adjusted before the apparatus is placed in service that substantially equal pressures are produced in the bars 16 and 17. When the magnetic test unit 14 is carried along the rail 11 and a current is passed through the rail 11 setting up a magnetic field, both magnetostrictive bars 16 and 17 will be magnetized and will tend either to expand or to contract, depending upon the material of which they are composed, both being preferably made of the same material with the arrangement shown, and both the piezo-electric units 20 and 21 will have the pressures thereon altered. As long as the rail 11 is without flaws, the magnetic field surrounding it will be uniform and the voltages or electrical charges induced in the piezo-electric units will be equal so that no effect appears in the amplifier 22. However, in case of a flaw in the rail, the magnetization of the bars 16 and 17 will be unequal and one of the piezo-electric units will be stressed more than the other. In this case, the voltages induced between the faces of one of the pairs of piezo-electric slabs will be greater than the voltages induced between the faces of the other pair of piezo-electric slabs.

For example, assume that greater voltages are induced between the faces of the slabs 25 and 26. A greater charge of one polarity will, therefore, be built up on the plate 27 than the charge of opposite polarity on the plate 30 and the potential of the lead 32 will be altered, thereby producing a response in the amplifier 22. If a recorder 23 is connected to the output terminals of the amplifier 22, the response of the amplifier 22 caused by a defect in the rail will produce a deflection 33 in the record curve of the recorder 23, thereby indicating a defect in the portion of the rail corresponding to the portion 33 of the strip chart in the recorder 23. It will be understood that the longitudinal co-ordinate of the strip chart in the recorder 23 may be calibrated in terms of miles along the rail 11 from a predetermined starting point.

Owing to the fact that the piezo-electric units 20 and 21 have a linear variation of volts with pressure and owing to the fact that temperature differences will leak off the piezo-electric units as fast as they are produced, the differential magnetic detector unit 14 is substantially free from temperature effects.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A device for detecting fissures in rails adapted to have a current passed therethrough longitudinally, said device comprising in combination, a rigid frame adapted to be carried along a rail to be tested, a pair of substantially parallel magnetostrictive bars mounted in said frame transverse to the general direction of flow of the current, a pair of piezo-electric elements, each clamped between the end of one of said magnetostrictive bars and a portion of said frame so as to be subjected to pressure variations as said magnetostrictive bars tend to elongate or contract, and means responsive to voltages induced in said piezo-electric elements, said elements being so connected to said voltage-responsive means as to act differentially thereupon.

2. Apparatus for testing a piece adapted to have a current passed therethrough, said apparatus comprising in combination a pair of magnetostrictive bars adapted to be carried along in a position transverse to the direction of current in a piece being tested, a pair of piezo-electric units, means differentially responsive to voltages induced in said piezo-electric units, and relatively rigid means clamping one of said bars and one of said piezo-electric units together and clamping the other of said bars and the other of said piezo-electric units together, such that said piezo-electric units will be subject to pressure variations as said magnetostrictive bars tend to elongate or contract.

3. Apparatus for testing a piece in a magnetic field, said apparatus comprising in combination, a pair of substantially parallel magnetostrictive bars adapted to be carried in the magnetic field along the piece being tested, a pair of piezo-electric units, means differentially responsive to voltages induced in said piezo-electric units, and relatively rigid means clamping one of said bars and one of said piezo-electric units together and clamping the other of said bars and the other of said piezo-electric units together, such that said piezo-electric units will be subject to pressure variations as said magnetostrictive bars tend to elongate or contract.

4. A magnetic detector comprising in combination, a magnetostrictive bar adapted to be subjected to a magnetic field parallel thereto, a plate of conducting material, a pair of piezo-electric elements with faces of one polarity against said conducting plate and with faces of the other polarity away from each other, relatively rigid means clamping said piezo-electric elements and said magnetostrictive bar together with one of said outer faces toward an end of said bar to subject the pair of piezo-electric elements to pressure variations as said bar tends to elongate or contract, and voltage-responsive means connected between said conducting plate and at least one of said outer faces.

JERRY L. STRATTON.